United States Patent

Tanaka et al.

Patent Number: 5,993,975
Date of Patent: Nov. 30, 1999

[54] COATING COMPOSITION AND ONE LAYER-COATED STEEL PLATE

[75] Inventors: Shoichi Tanaka, Chigasaki; Takashi Nakano, Hiratsuka, both of Japan

[73] Assignee: Kansai Paint Co., Ltd., Japan

[21] Appl. No.: 08/733,783

[22] Filed: Oct. 18, 1996

[30] Foreign Application Priority Data

Oct. 20, 1995 [JP] Japan ..................................... 7-295920

[51] Int. Cl.$^6$ ........................... B32B 15/04; B32B 27/06; C08F 20/00

[52] U.S. Cl. ........................... 428/458; 428/457; 428/480; 428/500; 428/502; 428/469; 525/441; 525/443; 525/509

[58] Field of Search .................... 428/457, 458, 428/480, 500, 502, 469; 525/10, 443, 509, 441

[56] References Cited

U.S. PATENT DOCUMENTS

| | | | |
|---|---|---|---|
| 4,238,583 | 12/1980 | Tobias et al. | 525/443 |
| 4,374,164 | 2/1983 | Blank | 427/385.5 |
| 4,457,965 | 7/1984 | Rocholl et al. | 428/141 |
| 4,734,467 | 3/1988 | Yamada et al. | 525/440 |
| 5,166,288 | 11/1992 | Kanai et al. | 525/443 |
| 5,374,682 | 12/1994 | Gouda et al. | 525/185 |
| 5,393,605 | 2/1995 | Miyoshi et al. | 428/327 |
| 5,597,861 | 1/1997 | Nakae et al. | 524/601 |
| 5,623,003 | 4/1997 | Tanaka | 523/428 |
| 5,635,251 | 6/1997 | Oda et al. | 427/407.1 |
| 5,635,555 | 6/1997 | Vranken et al. | 524/407 |

FOREIGN PATENT DOCUMENTS

| | | |
|---|---|---|
| 2 094 815 | 9/1982 | United Kingdom . |
| 2 287 943 | 10/1995 | United Kingdom . |

*Primary Examiner*—D. S. Nakarani
*Assistant Examiner*—Holly C Rickman
*Attorney, Agent, or Firm*—Wenderoth, Lind & Ponack, L.L.P.

[57] ABSTRACT

The present invention provides a coating composition capable of forming, on a zinc or zinc alloy plated steel plate subjected to a chromate chemical treatment, a coating film superior in processability, corrosion resistance, adhesive property, impact resistance, scratch resistance, etc. This composition comprises:

(A) a polyester resin having a glass transition temperature of −25° C. to 35° C., a number-average molecular weight of 1,000–35,000 and a hydroxyl value of 3–80 mgKOH/g, (B) a melamine resin curing agent which is a methyl-etherified melamine resin, or a mixture of a methyl-etherified mel amine resin and a butyl-etherified melamine resin, (C) a rust preventive pigment, and (D) organic polymer fine particles, wherein the proportions of the individual components are:

(A) 60–95 parts by weight, (B) 5–40 parts by weight, (C) 1–50 parts by weight per 100 parts by weight of the total of (A) and (B), and (D) 2–40 parts by weight per 100 parts by weight of the total of (A) and (B).

10 Claims, No Drawings

COATING COMPOSITION AND ONE LAYER-COATED STEEL PLATE

BACKGROUND OF THE INVENTION

1. Field of the Invention

The present invention relates to a coating composition used for rough texture-surface finish, capable of forming a coating film which is superior in processability, corrosion resistance, adhesivity, impact resistance, scratch resistance, etc. and which has a rough texture, particularly a coating composition suitable for imparting rough texture-surface finish in one layer-coating; a process for producing a one layer-coated steel plate, which comprises coating the above coating composition; and a one layer-coated steel plate which is a steel plate having thereon a cured film of the above coating composition and which is suitable for processing into various articles.

2. Description of the Prior Art

As coated steel plates to be processed into various household electric or electronic appliances wherein decorativeness is required, such as VTR, radio with cassette tape recorder and CD player, electronic oven, washing machine, refrigerator and the like, there were proposed coated steel plates obtained by coating, on a steel plate, a coating for rough texture-surface finish (which is a dispersion of organic polymer fine particles in a binder) as an outermost layer [such coated steel plates are described in, for example, Japanese Patent Application Kokai (Laid-Open) No. 168967/1982 (corresponding to U.S. Pat. No. 4,457,965 and GB-A-094,815) and Japanese Patent Application Kokai (Laid-Open) No. 74970/1987].

Of these coated steel plates, two layer-coated steel plates are in practical application, and they are obtained by coating, on a galvanized steel plate subjected to a chemical treatment, a coating for rough texture-surface finish (which is a dispersion of organic polymer fine particles in a binder) as an outermost layer via an undercoat of polyester or epoxy type to form a cured film of the coating on the steel plate. In production of two layer-coated steel plate, since the coating steps are many, there are required rationalization of coating, coating in shorter time, coating in thinner film or/and one layer-coating (the latter two items lead to resource saving). Application of a conventional coating for rough texture-surface finish, directly on a galvanized steel plate gives a coating film inferior in processability, corrosion resistance, adhesivity, scratch resistance, etc.

Hence, the present inventors made a study with an aim of developing a one layer-coated steel plate capable of forming a coating film superior in processability, corrosion resistance, adhesivity, impact resistance, scratch resistance, etc. As a result, the present inventors found out that the above aim can be achieved by coating, on a zinc or zinc alloy plated steel plate subjected to a chromate chemical treatment, directly and not via an undercoat, a coating comprising a particular hydroxyl group-containing polyester resin, a particular melamine resin, a rust preventive pigment and organic polymer fine particles. The present invention has been completed based on the finding.

SUMMARY OF THE INVENTION

The present invention provides a coating composition comprising:
- (A) a polyester resin having a glass transition temperature of −25° C. to 35° C., a number-average molecular weight of 1,000–35,000 and a hydroxyl value of 3–80 mgKOH/g,
- (B) a melamine resin curing agent which is a methyl-etherified melamine resin, or a mixture of a methyl-etherified melamine resin and a butyl-etherified melamine resin,
- (C) a rust preventive pigment, and
- (D) organic polymer fine particles, wherein the proportions of the individual components are:
- (A) 60–95 parts by weight,
- (B) 5–40 parts by weight,
- (C) 1–50 parts by weight per 100 parts by weight of the total of (A) and (B), and
- (D) 2–40 parts by weight per 100 parts by weight of the total of (A) and (B).

The present invention further provides a process for producing a one layer-coated steel plate, which comprises coating the above coating composition on a zinc or zinc alloy plated steel plate subjected to a chromate chemical treatment.

The present invention furthermore provides a one layer-coated steel plate obtained by coating the above coating composition on a zinc or zinc alloy plated steel plate subjected to a chromate chemical treatment, to form a cured coating film of the composition on the steel plate.

DETAILED DESCRIPTION OF THE INVENTION

The present invention is hereinafter described in more detail.

Polyester Resin (A)

The polyester resin (A) used in the present coating composition is a hydroxyl group-containing polyester resin and includes, for example, an oil-free polyester resin, an alkyd resin, and modified resins thereof such as urethane-modified polyester resin, urethane-modified alkyd resin, epoxy-modified polyester resin and the like.

The polyester resin is required, from the standpoints of the processability, hardness, solvent resistance and staining resistance of the coating film obtained, the handleability of the resin, and so forth, to have a number-average molecular weight of 1,000–35,000, preferably 2,500–33,000, particularly 7,000–25,000, a glass transition temperature of −25° C. to 35° C. preferably −20° C. to 25° C., particularly −10° C. to 20° C., and a hydroxyl value of 3–80 mgKOH/g, preferably 3–70 mgKOH/g, particularly 5–50 mgKOH/g. In the present specification, the glass transition temperature (Tg) is one obtained by DTA; and the number-average molecular weight is one obtained by GPC using a calibration curve of standard polystyrene.

The oil-free polyester resin comprises an ester between a polybasic acid and a polyhydric alcohol. As the polybasic acid, there can be mainly used at least one dibasic acid selected from phthalic anhydride, isophthalic acid, terephthalic acid, succinic acid, adipic acid, fumaric acid, maleic anhydride, tetrahydrophthalic anhydride, hexahydrophthalic anhydride, etc., or a lower alkyl ester of the dibasic acid. There can also be used as necessary, in combination with the above dibasic acid or a lower alkyl ester thereof, a monobasic acid such as benzoic acid, crotonic acid, p-tert-butylbenzoic acid or the like; a tri- or higher basic acid such as trimellitic anhydride, methylcyclohexenetricarboxylic acid, pyromellitic anhydride or the like; and so forth. As the polyhydric alcohol, there can be used mainly used a dihydric alcohol such as ethylene glycol, propylene glycol, diethylene glycol, butanediol, neopentyl glycol, 3-methylpentanediol, 1,4-hexanediol, 1,6-hexanediol or the like. There can also be used as necessary, in combination with the dihydric alcohol, a tri- or higher hydric alcohol such as glycerine, trimethylolethane, trimethylolpropane, pentaerythritol or the like. The esterification or ester exchange reaction between the polybasic acid and the polyhydric alcohol can be conducted by a per se known process. The polybasic acid is particularly preferably terephthalic acid, isophthalic acid, or a lower alkyl ester thereof.

The alkyd resin is one obtained by reacting the acid component and alcohol component of the above-mentioned oil-free polyester resin and an oil fatty acid by a per se known process. The oil fatty acid includes, for example, coconut oil fatty acid, soybean oil fatty acid, linseed oil fatty acid, safflower oil fatty acid, tall oil fatty acid, dehydrated castor oil fatty acid and tung oil fatty acid. The oil length of the alkyd resin is preferably 30% or less, particularly 5–20%.

The urethane-modified polyester resin includes one obtained by reacting the above-mentioned oil-free polyester resin or an oil-free polyester resin of low-molecular weight (obtained by reacting the acid component and the alcohol component both used in production of the former oil-free polyester resin) with a polyisocyanate compound by a per se known process. The urethane-modified alkyd resin includes one obtained by reacting the above-mentioned alkyd resin or an alkyd resin of low-molecular weight (obtained by reacting the components used in production of the former alkyd resin) with a polyisocyanate compound by a per se known process. The polyisocyanate compound usable in production of the urethane-modified polyester resin or the urethane-modified alkyd resin includes, for example, hexamethylene diisocyanate, isophorone diisocyanate, xylylene diisocyanate, tolylene diisocyanate, 4,4'-diphenylmethane diisocyanate, 4,4'-methylenebis(cyclohexyl isocyanate) and 2,4,6-triisocyanatotoluene. In the urethane-modified polyester or alkyd resin, the preferable amount of the polyisocyanate compound is generally 0.1–30% by weight based on the urethane-modified resin.

The epoxy-modified polyester resin includes reaction products obtained by addition, condensation, grafting or the like between polyester resin and epoxy resin; for example, a reaction product between (a) the carboxyl group of a polyester resin obtained from the components used in production of the previously mentioned polyester resin and (b) an epoxy group-containing resin, and a reaction product obtained by bonding the hydroxyl group of polyester resin and the hydroxyl group of epoxy resin via a polyisocyanate compound. The preferable degree of modification in the epoxy-modified polyester resin is generally 0.1–30% by weight based on the epoxy-modified polyester resin.

Of the above-mentioned polyester resins, particularly preferable is the oil-free polyester resin or the epoxy-modified polyester resin.

Melamine Resin Curing Agent (B)

In the present coating composition, there can be used, as the melamine resin curing agent (B), a methyl-etherified melamine resin, or a mixture of a methyl-etherified melamine resin and a butyl-etherified melamine resin.

The methyl-etherified melamine resin includes (1) a methyl-etherified melamine resin obtained by etherifying part or the whole of the methylol groups in a methylolmelamine resin (which is a melamine-formaldehyde adduct and may be a monomer or a polymer), with methanol, and (2) a mixed alcohol-etherified melamine resin obtained by etherifying part or the whole of the methylol groups in the above-mentioned methylolmelamine resin, with a mixed alcohol between methanol and an alcohol of 2–4 carbon atoms (e.g. ethanol, isopropanol, n-butanol or isobutanol).

The methyl-etherified melamine resin is preferably one in which the number of methylol groups etherified with methyl alcohol is, on an average, 3 or more, preferably 4–6 per one triazine nucleus and which has a number-average molecular weight of 1,000 or less, preferably 250–900, from the standpoints of the compatibility with the polyester resin (A), the staining resistance and processability of the coating film obtained, etc.

Preferable specific examples of the methyletherified melamine resin include the following commercial products. That is, the methyl-etherifed melamine resin includes, for example, Cymel 303, Cymel 325, Cymel 327, Cymel 350, Cymel 730, Cymel 736 and Cymel 738 (these are products of Mitsui Cytec Co., Ltd.); Melan 522 and Melan 523 (these are products of Hitachi Chemical Co., Ltd.); Nikalac MS001 and Nikalac MX650 (these are products of Sanwa Chemical Co., Ltd.); Sumimal M-55 (a product of Sumitomo Chemical Co., Ltd.); and Resimine 740 and Resimine 747 (these are products of Monsanto Co.). The mixed alcohol (methyl alcohol and butyl alcohol)-etherified melamine resin includes, for example, Cymel 232, Cymel 266 and Cymel XV-514 (these are products of Mitsui Cytec Co., Ltd.); Nikalac MX500, Nikalac MX600 and Nikalac MS95 (these are products of Sanwa Chemical Co., Ltd.); and Resimine 753 and Resimine 755 (these are products of Monsanto Co.).

The butyl-etherified melamine resin used as a mixture with the methyl-etherified melamine resin includes, for example, a butyl-etherified melamine resin obtained by etherifying part or the whole of the methylol groups (preferably at least one, particularly 1–3 methylol groups on an average per one triazine nucleus) in a methylolmelamine resin (which is a melamine-formaldehyde adduct and may be a monomer or a polymer), with n-butyl alcohol or isobutyl alcohol. The butyl-etherified melamine resin has a number-average molecular weight of preferably 800–8,000, more preferably 900–5,000, most preferably 1,000–3,000 from the standpoints of the stability of the resulting coating composition, the staining resistance of the coating composition formed with the composition, etc.

Preferable specific examples of the butyl-etherified melamine resin include various commercial products, for example, U-van 20SE and U-van 28SE (these are products of Mitsui Toatsu Chemical, Inc.), and Superbeckamin J-820-60, Superbeckamin L-117-60, Superbeckamin L-109-65, Superbeckamin G-821-60, Superbeckamin 47-508-60 and Superbeckamin L-118-60 (these are products of Dainippon Ink and Chemical Inc.).

When the methyl-etherified melamine resin and the butyl-etherified melamine resin are used in combination, the butyl-etherified melamine resin inferior in compatibility with the polyester resin migrates onto the surface of the coating film formed and, as a result, the coating film, when cured, has excellent staining resistance and excellent hardness; meanwhile, the crosslinking of the coating film inside is brought about mainly by the methyl-etherified melamine resin and, as a result, the cured coating film obtained has good processability. The mixing ratio of the methyl-etherified melamine resin and the butyl-etherified melamine resin is generally 20/1 to 1/5, preferably 15/1 to 2/1, more preferably 10/1 to 4/1 by weight.

Curing Catalyst

In the present coating composition, a curing catalyst can be used as necessary in order to accelerate the curing reaction between the polyester resin (A) and the melamine resin curing agent (B). The curing catalyst includes, for example, strong acids and neutralization products thereof. Specific examples are sulfonic acids such as p-toluenesulfonic acid, dodecylbenzene-sulfonic acid, dinonylnaphthalenesulfonic acid, dinonylnaphthalenedisulfonic acid and the like, and neutralization products of these sulfonic acids with amines. Of these compounds, a neutralization product of p-toluenesulfonic acid with an amine and/or a neutralization product of dodecylbenzensulfonic acid with an amine is preferable from the standpoints of the stability and reactivity of coating composition, the properties of coating film formed, etc. The appropriate amount of the curing catalyst used is generally 0.1–3 parts by weight, preferably 0.2–2 parts by weight, more preferably 0.3–1.5 parts by weight per 100 parts by weight of the total of the polyester resin (A) and the melamine resin curing agent (B), in terms of the amount converted to that of strong acid.

Rust Preventive Pigment (C)

In the present coating composition, the rust preventive pigment (C) is used in order to impart corrosion resistance to the coating film formed. It can be any rust preventive pigment known per se in the coating field. Typical examples of the rust preventive pigment (C) are chromate type rust preventive pigments such as strontium chromate, zinc chromate, calcium chromate, barium chromate, zinc/potassium chromate and the like; phosphate type rust preventive pigments such as aluminum tripolyphosphate, zinc phosphate and the like; phytate type rust preventive pigments such as zinc phytate and the like; and silicate type rust preventive pigments such as basic lead silicate and the like. Of these, chromate rust preventive pigments are preferred with strontium chromate and calcium chromate being particularly preferred.

Organic Polymer Fine Particles (D)

In the present coating composition, the organic polymer fine particles (D) are suitably such organic polymer fine particles which have an average particle diameter of 0.2–80 µm, preferably 6–60 µm, more preferably 8–50 µm and which do not melt and flow out during the curing of composition applied and, even after the curing, remain as particles and can impart rough texture on the coating film surface. The organic polymer resin in the form of such fine particles includes, for example, a polyamide resin (e.g. nylon 11 or nylon 12), a silicone resin, a polymethyl methacrylate, a polystyrene, a methyl methacrylate-butadiene-styrene terpolymer, a polyacrylonitrile, a polyvinylidene fluoride, a melamine resin, a polypropylene and a phenolic resin. Of these resins, a polyamide resin is particularly preferable from the standpoints of the adhesive property, corrosion resistance, scratch resistance, etc. of the coating film formed.

Preparation and Application of Coating Composition

The coating composition of the present invention can be prepared by mixing the polyester resin (A), the melamine resin curing agent (B), the rust preventive pigment (C), the organic polymer fine particles (D) and, optionally, the curing catalyst all mentioned above.

The mixing ratio of the polyester resin (A) and the melamine resin curing agent (B), i.e. (A)/(B) can be 60/40 to 95/5, preferably 70/30 to 85/15, more preferably 75/25 to 85/15. When the amount of the polyester resin (A) is less than 60 parts by weight of the total (100 parts by weight) of the polyester resin (A) and the melamine resin curing agent (B), that is, the amount of the melamine resin curing agent (B) is more than 40 parts by weight, the coating film formed tends to have reduced processability. When the amount of the polyester resin (A) is more than 95 parts by weight, that is, the amount of the melamine resin curing agent (B) is less than 5 parts by weight, the coating film formed tends to have reduced properties in blocking resistance, staining resistance, hardness, solvent resistance, etc.

The amount of the rust preventive pigment (C) used can be 1–50 parts by weight, preferably 1.5–35 parts by weight, more preferably 2–20 parts by weight per 100 parts by weight of the total of the polyester resin (A) and the melamine resin curing agent (B). When the amount of the rust preventive pigment (C) used is less than 1 part by weight, the coating film formed tends to have no sufficient corrosion resistance. When the amount is more than 50 parts by weight, the coating film formed tends to have reduced appearance and processability.

The amount of the organic polymer fine particles (D) used can be 2–40 parts by weight, preferably 2.5–30 parts by weight, more preferably 3–20 parts by weight per 100 parts by weight of the total of the polyester resin (A) and the melamine resin curing agent (B). When the amount of the organic polymer fine particles (D) used is less than 2 parts by weight, the coating film formed tends to have insufficient rough texture and, resultantly, reduced decorativeness. When the amount is more than 40 parts by weight, the resulting coating composition tends to have lower coatability and the coating film formed tends to have reduced processability.

The coating composition of the present invention can be constituted substantially by the polyester resin (A), the melamine resin curing agent (B), the rust preventive pigment (C), the organic polymer fine particles (D) and, as necessary, the curing catalyst. Ordinarily, the coating composition further comprises an organic solvent for the reasons of the handleability, coatability, etc. As the organic solvent, there can be used one capable of dissolving or dispersing the components (A), (B), (C) and (D). Specific examples of the organic solvent are ketone solvents such as methyl isobutyl ketone, cyclohexanone, isophorone and the like; hydrocarbon solvents such as toluene, xylene, high-boiling petroleum fraction hydrocarbon and the like; ether solvents such as ethylene glycol monoethyl ether, ethylene glycol monobutyl ether, diethylene glycol monobutyl ether and the like; and ester solvents such as ethyl acetate, butyl acetate, ethylene glycol monoethyl ether acetate, diethylene glycol monoethyl ether acetate and the like. These organic solvents can be used singly or in admixture of two or more. These organic solvents can be used in such an amount that the solid content of the present coating composition becomes generally 20–70% by weight, preferably 30–60% by weight.

The present coating composition can be used as a coating containing no coloring pigment and also as an enamel coating containing a coloring pigment. The coloring pigment includes those ordinarily used in the coating field, for example, organic coloring pigments such as Cyanine Blue, Cyanine Green, organic red pigments (e.g. azo type and quinacridone type) and the like, and inorganic coloring pigments such as titanium white, Titan Yellow, red iron oxide, carbon black, chrome yellow, calcined pigments and the like. The present coating composition may comprise, as necessary, additives such as extender pigment (e.g. talc, clay, silica, mica or alumina), modifying resin for improving the adhesive property and properties of coating film formed (e.g. low-molecular epoxy resin), filler, defoaming agent and the like. The present coating composition may furthermore comprise an amine compound or the like in order to form a fine crepe pattern on the coating film obtained or to allow the coating film to have an improved surface hardness. The amine compound includes, for example, secondary or tertiary amines such as triethylamine, diisopropylamine, diisobutylamine, di-n-butylamine and the like.

The present coating composition can be coated on various substrates. When the present coating composition is used for production of one layer-coated steel plate, the substrate (steel plate) is desirably a zinc or zinc alloy plated steel plate subjected to a chromate chemical treatment. The zinc or zinc alloy plated steel plate may be a hot-dip-zinc or zinc alloy plated steel plate, an electro-zinc or zinc alloy plated steel plate. The zinc alloy-plated steel plate includes, for example, a galvannealed steel plate, a nickel/zinc alloy-plated steel plate and an aluminum/zinc alloy-plated steel plate. A hot-dip-zinc or zinc alloy plated steel plate is preferred from the standpoint of the corrosion resistance of the coated plates.

The chromate chemical treatment for formation of a chromate-treated layer on a zinc or zinc alloy plated steel plate can be conducted by a per se known chromate treatment of reaction type, coating type, electrolysis type or the like. In the treatment, the amount of chromium deposited is preferably 10–200 mg/m$^2$ particularly 10–100 mg/m$^2$ in terms of the amount of metallic chromium, from the standpoints of the corrosion resistance and processability of the coated plates.

Specific examples of the chromate treating solution used for formation of the chromate-treated layer are as follows.

An example of the chromate treating solution of reaction type contains, as the main components, 1–100 g/l (in terms of metallic chromium) of a water-soluble chromium compound and 0.2–20 g/l of sulfuric acid, wherein the trivalent chromium content in total chromium is 50% by weight or less, preferably 20–35% by weight, and may further contain, as necessary, an appropriate amount of other metal ion (e.g. $Zn^{2+}$, $Co^{2+}$ or $Fe^{3+}$) and other mineral acid (e.g. phosphoric acid or fluoric acid).

An example of the chromate treating solution of coating type is obtained by adding, to a chromate treating solution having the same formulation as the above reaction type chromate treating solution, an organic polymer resin having a large amount of carboxyl groups in the molecule and being water-soluble and compatible with said chromate treating solution, and then adjusting the pH of the resulting mixture to 2–3.5.

The organic polymer resin preferably has a number-average molecular weight of 1,000–500,000, particularly 1,500–100,000 and includes, for example, a polyacrylic acid, a starch and a celullose derivative. The amount of the organic polymer resin added can be generally 0.02–30 g/l, preferably 0.1–20 g/l in terms of the resin content.

The above-mentioned chromate chemical treatment is applied on a zinc or zinc alloy plated steel plate, followed by air-drying or heat-drying; then, the resulting steel plate is coated with the present coating composition; thereby, a one layer-coated steel plate according to the present invention can be produced.

The application of the present coating composition is not particularly restricted and can be conducted, for example, by curtain flow coating, roll coating, dip coating or spray coating. The preferable film thickness in which the present coating composition is applied, is generally 5–30 µ, particularly 10–25 µas dried. The conditions for curing the coating film formed can be appropriately determined from the curing temperature and baking time of coating. When the present coating composition is applied by coil coatings such as roll coating, the preferable curing conditions are generally 160–260° C. (the maximum temperature of base metal) and 15–90 seconds, particularly 200–230° C. for 30–70 seconds.

EXAMPLES

The present invention is hereinafter described specifically by way of Examples. In the followings, parts and % are by weight in all cases.

Examples 1–9 and Comparative Examples 1–6

Topcoatings were obtained using the formulations shown in Table 1. Each of these topcoatings was coated on a hot-dip-galvanized steel plate subjected to a chromate treatment, having a thickness of 0.5 mm (the steel plate was galvanized on both sides and the zinc amount on one side was 60 g/m$^2$) by the use of a bar coater so as to form a coating film having a thickness (as dried) of about 18 µm. Each coated plate was baked for 60 seconds at such a temperature that the maximum temperature of the base material (the steel plate beneath the coating film) became 220° C., whereby various coated steel plates were obtained. The coated steel plates were tested for various test items.

The test results are shown in Table 3. In Table 1, the amounts of polyester resin and melamine resin are each expressed as weight of solid content; and the amount of curing catalyst is expressed as weight converted to that of sulfonic acid. In the Examples and Comparative Examples, carbon black (a black pigment) was dispersed and a mixed solvent [cyclohexanone/Swasol 1,500 (an aromatic high-boiling solvent of petroleum origin, a product of Cosmo Oil Co., Ltd.)=60/40 (by weight)] was used for viscosity control of coating, etc. In application of each topcoating, the viscosity thereof was adjusted to about 100 seconds (25° C.) when measured by the use of a Ford cup #4.

Reference Example 1

A coated steel plate was obtained in the same operation as in Example 1 except that the hot-dip-galvanized steel plate subjected to a chromate treatment, having a thickness of 0.5 mm was replaced by a hot-dip-galvanized steel plate subjected to a zinc phosphate treatment, having a thickness of 0.5 mm (the steel plate was galvanized on both sides and the zinc amount on one side was 60 g/m$^2$). The coated steel plate was tested for various test items. The test results are shown in Table 3.

TABLE 1

| Component | | Examples | | | | | | | | |
|---|---|---|---|---|---|---|---|---|---|---|
| | | 1 | 2 | 3 | 4 | 5 | 6 | 7 | 8 | 9 |
| Polyester resin | Vylon KS-1730V (*1) | 80 | 70 | 80 | | 85 | | 80 | | |
| | Vylon KS-1640V (*2) | | | | 85 | | | | 92 | |
| | Vylon KS-1860V (*3) | | | | | | 80 | | | |
| | Alkynol 1665 (*4) | | | | | | | | | 80 |
| | Vylon GK-250 (*5) | | | | | | | | | |
| Melamine resin | Cymel 303 (*6) | 20 | 30 | 20 | 15 | 10 | 15 | 15 | 8 | 20 |
| | Superbeckamin J-820-60 (*7) | | | | | 5 | 5 | | | |
| | Superbeckamin G-821-60 (*8) | | | | | | | 5 | | |

TABLE 1-continued

| Components | | 1 | 2 | 3 | 4 | 5 | 6 | 7 | 8 | 9 | 10 |
|---|---|---|---|---|---|---|---|---|---|---|---|
| Rust-proof pigment | Strontium chromate | 5 | 2 | | | 14 | 10 | 4 | 5 | 20 | 2 |
| | Calcium chromate | | | 3 | 4 | | | 1 | | | |
| Organic polymer fine particles | Orgasol 2002ES3 (*9) | 10 | | 20 | | | | 10 | | 5 | 10 |
| | Orgasol 2002ES5 (*10) | | 3 | | 5 | 10 | | | | | |
| | TEXTURE 5378 (*11) | | | | | | 7 | | | | |
| Curing catalyst | Neutralization product of PTSA (*12) | 0.5 | | | 0.5 | 0.5 | | 0.5 | | | |
| | Neutralization product of DDBSA (*13) | | 0.5 | 0.5 | | | 0.5 | | | 0.5 | 0.5 |
| Modifying resin | Epikote 1001 (*14) | | | | | | 1 | | | | |
| | Di-n-butylamine | | | | | | | | | | 0.2 |
| Coloring pigment | Carbon black | 8 | 8 | 8 | 8 | 8 | 8 | 8 | 8 | 8 | |
| Extender pigment | Silica fine powder | 0.5 | 0.5 | — | 0.5 | 0.5 | 0.5 | — | 0.5 | 0.5 | |

| | | Comparative Examples | | | | | |
|---|---|---|---|---|---|---|---|
| Components | | 1 | 2 | 3 | 4 | 5 | 6 |
| Polyester resin | Vylon KS-1730V (*1) | 80 | 55 | 96 | | 80 | 80 |
| | Vylon KS-1640V (*2) | | | | | | |
| | Vylon KS-1860V (*3) | | | | | | |
| | Alkynol 1665 (*4) | | | | | | |
| | Vylon GK-250 (*5) | | | | 85 | | |
| Melamine resin | Cymel 303 (*6) | 20 | 45 | 4 | 15 | 20 | 20 |
| | Superbeckamin J-820-60 (*7) | | | | | | |
| | Superbeckamin G-821-60 (*8) | | | | | | |
| Rust-proof pigment | Strontium chromate | | | 5 | 5 | 5 | 60 | 5 |
| | Calcium chromate | | | | | | | |
| Organic polymer fine particles | Orgasol 2002ES3 (*9) | 10 | 10 | 10 | 10 | 10 | 1 |
| | Orgasol 2002ES5 (*10) | | | | | | |
| | TEXTURE 5378 (*11) | | | | | | |
| Curing catalyst | Neutralization product of PTSA (*12) | 0.5 | 0.5 | 0.5 | | 0.5 | |
| | Neutralization product of DDBSA (*13) | | | | 0.5 | | 0.5 |
| Modifying resin | Epikote 1001 (*14) | | | | | | |
| | Di-n-butylamine | | | | | | |
| Coloring pigment | Carbon black | 8 | 8 | 8 | 8 | 8 | 8 |
| Extender pigment | Silica fine powder | 0.5 | 0.5 | 0.5 | 0.5 | 0.5 | 0.5 |

In Table 1, (*1) to (*14) refer to the followings.

(*1), (*2), (*3) and (*5) Vylons: polyester resins having the properties as shown in Table 2, produced by Toyobo Co., Ltd.

TABLE 2

| | Tg (° C.) | Hydroxyl value (mgKOH/g) | Number-average molecular weight |
|---|---|---|---|
| Vylon KS-1730V | −1 | 14 | 22,000 |
| Vylon KS-1640V | 20 | 10 | 11,000 |
| Vylon KS-1860V | −8 | 17 | 32,000 |
| Vylon GK-250 | 60 | 12 | 12,000 |

(*4) Alkynol 1665: a polyester resin having a Tg of −14° C., a hydroxyl value of 56 mgKOH/g and a number-average molecular weight of 2,900, produced by Sumitomo Bayer Urethane Co., Ltd.

(*6) Cymel 303: a methyl-etherified melamine resin of low molecular weight (number-average molecular weight=1,000 or less) having a hexakis (methoxymethyl)-melamine content of 60% by weight or more, produced by Mitsui Cytec Co., Ltd.

(*7) Superbeckamin J-820-60: a n-butyl-etherified melamine resin produced by Dainippon Ink and Chemical Inc.

(*8) Superbeckamin G-821-60: an isobutyl-etherified melamine resin produced by Dainippon Ink and Chemical Inc.

(*9) Orgasol 2002ES3: nylon 12 fine particles having an average particle diameter of about 30 μm, produced by Ato Chem. (France).

(*10) Orgasol 2002ES5: nylon 12 fine particles having an average particle diameter of about 50 μm, produced by Ato Chem. (France).

(*11) TEXTURE 5378: polypropylene fine particles having an average particle diameter of about 25 μm, produced by Shamrock Chemicals Co.

(*12) Neutralization product of PTSA: a neutralization product obtained by neutralizing p-toluenesulfonic acid with di-n-butylamine (neutralization equivalent of acid with amine: 1.0)

(*13) Neutralization product of DDBSA: a neutralization product obtained by neutralizing dodecylbenzenesulfonic acid with dimethyloxazolidine (neutralization equivalent of acid with amine: 1.0)

(*14) Epikote 1001: a bisphenol A type low-molecular-weight epoxy resin produced by Yuka Shell Epoxy K.K.

TABLE 3

| | | Example | | | | | | | | | Comparative Examples | | | | | | Referential Example |
|---|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 | 1 |
| Test items | Appearance of coating film surface | ◎ | ◎ | ◎ | ◎ | ◎ | ◎ | ◎ | ◎ | ◎ | ◎ | ◎ | ◎ | ◎ | ◎ | Δ | ◎ |
| | Pencil hardness | F | H | F | H | F | F | F | F | H | F | H | HB | H | H | F | F |
| | Bendability | 0T | 2T | 0T | 2T | 0T | 0T | 0T | 1T | 1T | 0T | 4T | 0T | 4T | 4T | 0T | 0T |
| | Impact resistance | ◎ | ◎ | ◎ | ◎ | ◎ | ◎ | ◎ | ◎ | ◎ | ◎ | Δ | ◎ | ○ | Δ | ◎ | ◎ |
| | Adhesive property | ◎ | ◎ | ◎ | ◎ | ◎ | ◎ | ◎ | ◎ | ◎ | Δ | ◎ | ○ | Δ | ◎ | ◎ | ◎ |
| | Solvent resistance | 50< | 50< | 50< | 50< | 50< | 50< | 50< | 50< | 50< | 50< | 50< | 30 | 50< | 50< | 50< | 50< |
| | Corrosion resistance | ◎ | ◎ | ◎ | ◎ | ◎ | ◎ | ◎ | ◎ | ◎ | x | Δ | Δ | ◎ | ◎ | ◎ | Δ |
| | Scratch | ○ | ○ | ○ | ○ | ○ | ○ | ○ | ○ | ○ | ○ | ○ | Δ | ○ | Δ | ○ | ○ |

The test items shown in Table 3 were tested according to the following test methods.

Appearance of Coating Film Surface

The uniformity of rough texture of coating film (30 cm×30 cm) surface was observed visually and rated according to the following yardstick.

⊚: The rough texture of surface was uniform and any place of the surface gave the same reflected light.

○: 1–4 places of the surface each gave a reflected light different from that given by the circumference thereof.

Δ: 5–10 places of the surface each gave a reflected light different from that given by the circumference thereof.

X: More than 10 places of the surface each gave a reflected light different from that given by the circumference thereof.

Pencil Hardness

A pencil scratch test specified by JIS K 5400 8.4.2 (1990) was conducted, and the scratch of coating film was rated.

Bendability

A test plate (having a coating film) was bent by 180° in a room of 20° C. with the coating film side directed outward relative to the bending, to examine the appearance of cracking at the bent portion. The bendability of the test plate was expressed by the minimum T number when no cracking appeared at the bent portion. The minimum T number was specifically expressed by 0T (when the test plate was bent with nothing inserted inside the bent portion), 1T (when the test plate was bent with one plate of the same thickness as the test plate inserted inside the test plate), 2T (when the test plate was bent with two plates each of the same thickness as the test plate inserted inside the test plate) . . . , or 4T (when the test plate was bent with four plates each of the same thickness as the test plate inserted inside the test plate).

Impact Resistance

An impact was applied on the coating film surface of a coated plate under the conditions of falling weight=500 g, diameter of roundness at top end of shock mould=½ in., and falling height=50 cm, according to the DuPont method type impact resistance test specified by JIS K 5400 8.3.2 (1990). Then, a cellophane pressure-sensitive tape was attached onto the impact-applied portion of the coated plate; the tape was peeled quickly; and the extent of peeling of coating film was rated according to the following yardstick.

○: No peeling of coating film

Δ: Slight peeling of coating film

X: Considerable peeling of coating film

Adhesive Property

Eleven parallel straight lines (distance between two adjacent lines: 1 mm) were drawn in the coating film of a test plate (having a coating film) in each of the two directions normal to each other, with a cutter knife so that the lines reached the base plate of the test plate, whereby 100 squares each of 1 mm×1 mm were formed. Then, a cellophane pressure-sensitive tape was attached onto the coating film; the tape was peeled quickly; and the condition of the coating film after tape peeling was observed and rated according to the following yardstick.

○: No peeling of coating film occurred.

Δ: Slight peeling of coating film occurred, but at least 90 squares remained unpeeled.

X: Severe peeling of coating film occurred and the number of remaining squares was smaller than 90.

Solvent Resistance

In a room of 20° C., a gauze impregnated with methyl ethyl ketone was allowed to reciprocate on the coating film of a coated galvanized steel plate over a distance of about 5 cm, with a load of about 1 kg/cm² being applied onto the gauze. The times of reciprocation up to the first appearance of the base material (galvanized steel plate) of the coated plate was recorded. In Table 3, 50< refers to a case where the base material did not appear even after 50 times of reciprocation.

Corrosion Resistance

Knife cross-cutting was applied to a test plate (having a coating film) so that the cutting reached the base plate of the test plate. The resulting plate was subjected to a 240-hour salt spray test according to JIS Z 2371. The plate after the salt spray test was examined for the extent of white rust which appeared at the cross-cut portion, and the corrosion resistance of the test plate was rated according to the following yardstick.

⊚: No white rust appeared.

○: A slight amount of white rust appeared.

Δ: A considerable amount of white rust appeared, but there was no bulging at the cross-cut portion.

X: A considerable amount of white rust appeared and, moreover, there was bulging at the cross-cut portion.

Scratch Resistance

The periphery of a 10-yen copper coin was strongly pressed onto the coating film of a test plate (having a coating film) at an angle of about 45° and, in this state, the coin was pulled by about 1 cm to generate a scratch on the coating film. The scratch resistance of the test plate was rated from the extent of scratch and the resistance of coating film to peeling from base plate.

⊚: No base metal was seen at the scratched portion.

○: The base metal was slightly seen at the scratched portion.

Δ: The base metal was considerably seen at the scratched portion.

X: Easy peeling of coating film occurred at the film portion with which the coin contacted, and the surface of the base metal was seen clearly.

As stated above, the coating composition of the present invention is a polyester-amino resin type coating for rough texture-surface finish, suited for one layer-coating. The coated steel plate obtained by coating the present coating composition on a zinc or zinc alloy plated steel plate subjected to a chromate chemical treatment, directly and not via an undercoat, although being a one layer-coated steel plate, is superior in processability, corrosion resistance, adhesive property, impact resistance, scratch resistance, etc., and moreover has a rough texture and has excellent decorativeness.

In production of the present coated steel plate which is a one layer-coated steel plate, there can be realized the simplification of coating operation, the rationalization and time shortening of coating, and resource saving. Further, the present coating composition can form a coating film of rough texture (consequently having excellent decorativeness) on a zinc or zinc alloy plated steel plate and, therefor, is particularly suitable as a topcoating used in production of a coated steel plate to be processed into articles (e.g. household electric or electronic appliances) needing decorativeness.

What is claimed is:

1. A coating composition comprising:

(A) a polyester resin having a glass transition temperature of −20° C. to 25° C., a number-average molecular weight of 2,500–33,000 and a hydroxyl value of 5–50 mgKOH/g, (B) a melamine resin curing agent which is a mixture of a methyl-etherified melamine resin and a butyl-etherified melamine resin, the mixing ratio of methyl-etherified melamine resin to butyl-etherified melamine resin being 15/1 to 2/1 by weight, (C) a chromate rust preventive pigment, and (D) organic polymer fine particles having an average particle diameter of 6–60 μm, and (E) a curing catalyst which is a neutralization product between a sulfonic acid and an amine, wherein the proportions of the individual components are:

(A) 60–95 parts by weight, (B) 5–40 parts by weight, (C) 1.5–35 parts by weight per 100 parts by weight of the total of (A) and (B), and (D) 2.5–30 parts by weight per 100 parts by weight of the total of (A) and (B), and (E) 0.1 to 3 parts by weight per 100 parts by weight of the total of (A) and (B), of said sulfonic acid.

2. The composition of claim 1, wherein the polyester resin (A) is an oil-free polyester resin or an epoxy-modified polyester resin.

3. The composition of claim 1, wherein the chromate type rust preventive pigment is strontium chromate or calcium chromate.

4. The composition of claim 1, wherein the organic polymer fine particles are polyamide resin fine particles.

5. The composition of claim 1, wherein the sulfonic acid for forming the curing catalyst (E) is p-toluenesulfonic acid of dodecylbenzenesulfonic acid.

6. The composition of claim 1, wherein the solid content weight ratio of the polyester resin (A)/the melamine resin curing agent (B) is 70/30–85/15.

7. The composition of claim 1, which further comprises an organic solvent.

8. The process for producing a one layer-coated steel plate, which comprises coating a coating composition of claim 1 on a zinc or zinc alloy plated steel plate subjected to a chromate chemical treatment.

9. A one layer-coated steel plate obtained by coating a coating composition of claim 1 on a zinc or zinc alloy plated steel plate subjected to a chromate chemical treatment, to form a cured coating film of the composition on the steel plate.

10. The one layer-coated steel plate of claim 9, wherein the cured coating film has a thickness of 5–30 μm.

* * * * *